Patented Sept. 4, 1934

1,972,797

UNITED STATES PATENT OFFICE 1,972,797

TANNING ANIMAL HIDES

Josef Schäfer, Basel, Switzerland, assignor to the firm of "J. R. Geigy S. A.," Basel, Switzerland No Drawing. Application August 17, 1932, Serial No. 629,239. In Germany September 5, 1931

6 Claims. (Cl. 149—5)

The artificial tanning agents at present in use in the leather industry are generally made from phenols, either by condensing phenol sulphonic acids with formaldehyde or by converting phenol aldehyde resins into water soluble form by direct sulphonation or, as has recently been proposed, by heating them with aromatic sulphonic acids or with the crude reaction mixtures of the sulphonation of aromatic hydrocarbons.

Leather which has been made with the aid of these agents has the disadvantage that its fullness is inferior to that of vegetable tanned leather. Moreover it is not fast to light and becomes yellow rapidly and to a considerable degree not only on exposure to light but also during storage in a dark place. Furthermore some of these agents, as well as leather which has been tanned with them, have an extremely unpleasant odour of phenol.

It is known in the artificial resin industry that products which are suitable as substitutes for shellac and copal but, in comparison with phenolic artificial resins, are faster to light and odourless can be obtained by using as parent material dihydroxydiphenylsulphone instead of phenol. These products have not been proposed for use in tanning and in fact do not come into consideration owing to their insolubility in water.

According to this invention leather which is very fast to light and is not inferior in fullness to vegetable tanned leather is obtained by treating the skins to be tanned with suitable soluble condensation products of para-dihydroxydiphenysulphone. Such condensation products, soluble in water in all proportions, can be obtained very easily by heating para-dihydroxydiphenylsulphone with an aldehyde, preferably formaldehyde and an aqueous solution of a sulphonic acid of an aromatic hydrocarbon. If this reaction is carried out with a phenol instead of the para-dihydroxydiphenylsulphone there cannot be obtained by this very simple method condensation products of the desired solubility. When para-dihydroxydiphenylsulphone is used as parent material use may also be made of the more complicated methods above indicated in connection with phenolic resins. Products which are yet faster to light can also be obtained if instead of the sulphonic acids hereinbefore referred to there are used sulphonic acids of the most varied phenol ethers, particularly the substituted phenol ethyl ethers.

The following examples illustrate the invention, the parts being by weight:—

Example 1

100 parts of skins are treated in 200 parts of water with 50 parts of a tanning agent prepared in the following manner:—

100 parts of naphthalene sulphonic acid,
100 parts of para-dihydroxydiphenylsulphone,
50 parts of water and
40 parts of formaldehyde of 30 per cent strength are heated to boiling for 1¼ hours. The product, which is soluble in water to a clear solution is neutralized with caustic soda solution, evaporated and mixed with 10 per cent of its weight of sodium silicofluoride.

There is obtained with the aid of this tanning agent a very full white leather which is very stable to light.

Example 2

100 parts of skins are treated in 200 parts of water with 50 parts of a tanning agent prepared in the following manner:—

100 parts of tetrahydronaphthalene sulphonic acid,
60 parts of para-dihydroxydiphenylsulphone,
50 parts of water and
30 parts of formaldehyde of 30 per cent strength are heated to boiling for 1¼ hours. The product, which is soluble in water to a clear solution is neutralized with caustic soda solution, evaporated and mixed with 10 per cent of its weight of sodium silicofluoride.

There is obtained with the aid of this tanning agent a very full white leather which is very stable to light.

Example 3

100 parts of skins are treated in 200 parts of water with 50 parts of a tanning agent prepared in the following manner:—

Equal parts of diphenyl glycol ether and sulphuric acid of 93 per cent strength are heated together at 145° C. for ½ hour.

100 parts of the sulphonation mixture so obtained,
100 parts of para-dihydroxydiphenylsulphone,
50 parts of water and
40 parts of formaldehyde of 30 per cent strength are heated to boiling for 1¼ hours. The product, which is soluble in water to a clear solution is neutralized with caustic soda solution, evaporated and mixed with 10 per cent of its weight of sodium silicofluoride.

There is obtained with the aid of this tanning agent a very full white leather which is very stable to light.

*Example 4*

100 parts of skins are treated in 200 parts of water with 50 parts of a tanning agent prepared in the following manner:—

Equal parts of monophenyl glycol ether and sulphuric acid of 95 per cent strength are heated together for 2 hours at 110° C.

100 parts of the sulphonation mixture so obtained,
    70 parts of para-dihydroxydiphenylsulphone
    50 parts of water and
    40 parts of formaldehyde of 30 per cent strength are heated to boiling for 1¼ hours, during which operation the liquid separates into two layers. The whole is then heated for several hours at 110° C. under reduced pressure until the water is removed and a product is obtained which dissolves in water to a clear solution. The product is dissolved in water, neutralized with caustic soda solution, evaporated and mixed with 10 per cent of its weight of sodium silicofluoride.

There is obtained by means of this tanning agent a very full white leather which is very stable towards light.

In the foregoing examples, instead of formaldehyde, there can also be used para-formaldehyde or acetaldehyde.

There is obtained with the aid of this tanning agent a full yellowish white leather.

What I claim is:—

1. A process for tanning animal skins, consisting in treating the skins with a water soluble condensation product of para-dihydroxydiphenylsulphone and an aldehyde.

2. A process for tanning animal skins, consisting in treating the skins with a water soluble condensation product of para-dihydroxydiphenylsulphone and formaldehyde.

3. A process for tanning animal skins, consisting in treating the skins with a condensation product of para-dihydroxydiphenylsulphone and an aldehyde, subsequently rendered soluble in water.

4. A process for tanning animal skins, consisting in treating the skins with a condensation product of para-dihydroxydiphenylsulphone and formaldehyde in an aqueous sulphonated medium.

5. A process for tanning animal skins, consisting in treating the skins with a condensation product of para-dihydroxydiphenylsulphone and formaldehyde in an aqueous solution of a sulphonic acid of an aromatic hydrocarbon.

6. A process for tanning animal skins, consisting in treating the skins with a condensation product of para-dihydroxydiphenylsulphone and formaldehyde in an aqueous solution of naphthalene sulphonic acid.

JOSEF SCHÄFER.